United States Patent
Matsuno et al.

(10) Patent No.: US 7,480,440 B2
(45) Date of Patent: Jan. 20, 2009

(54) OPTICAL DISC RECORDING APPARATUS AND METHOD THEREOF

(75) Inventors: Katsumi Matsuno, Kanagawa (JP); Kenichiro Aridome, Kanagawa (JP); Hiroyuki Miyawaki, Kanagawa (JP)

(73) Assignee: Sony Corporation, Tokyo (JP)

(*) Notice: Subject to any disclaimer, the term of this patent is extended or adjusted under 35 U.S.C. 154(b) by 803 days.

(21) Appl. No.: 10/505,566

(22) PCT Filed: Nov. 11, 2003

(86) PCT No.: PCT/JP03/14327

§ 371 (c)(1), (2), (4) Date: Aug. 24, 2004

(87) PCT Pub. No.: WO2004/061846

PCT Pub. Date: Jul. 22, 2004

(65) Prior Publication Data

US 2005/0152679 A1    Jul. 14, 2005

(30) Foreign Application Priority Data

Dec. 26, 2002  (JP)  ............................. 2002-378434

(51) Int. Cl.
H04N 9/79 (2006.01)
H04N 5/76 (2006.01)
H04N 7/00 (2006.01)
H04N 5/00 (2006.01)

(52) U.S. Cl. ..................... 386/46; 386/45; 386/126

(58) Field of Classification Search ............. 386/45–46, 386/125–126

See application file for complete search history.

(56) References Cited

U.S. PATENT DOCUMENTS

| 7,248,783 B2* | 7/2007 | Hisatomi et al. .............. 386/70 |
| 2003/0068157 A1* | 4/2003 | Kushibe et al. ............... 386/69 |
| 2003/0123853 A1* | 7/2003 | Iwahara et al. ................ 386/69 |

FOREIGN PATENT DOCUMENTS

| JP | 11-213628 | 8/1999 |
| JP | 2000-82276 | 3/2000 |
| JP | 2000-322873 | 11/2000 |
| JP | 2002-56651 | 2/2002 |
| JP | 2002-335489 | 11/2002 |
| JP | 2002-352558 | 12/2002 |

* cited by examiner

Primary Examiner—Thai Tran
Assistant Examiner—Nigar Chowdhury
(74) Attorney, Agent, or Firm—Frommer Lawrence & Haug LLP; William S. Frommer; Thomas F. Presson

(57) ABSTRACT

There are provided: a unit data group formation section for forming a unit data group comprising at least one piece of unit data; a thumbnail image generation section for generating a thumbnail image for unit data; a link information generation section for generating unit data link information to link with each unit data forming the unit data group; a data group generation section for generating a data group comprising a unit data group and unit data link information; and a closed session processing section for performing a closed session process so that other reproducing apparatuses can read an optical disc recording at least one data group. The closed session processing section generates a menu image including the thumbnail image based on the unit data, generates menu image link information for linking with the menu image, and records the menu image and the menu image link information on an optical disc.

6 Claims, 15 Drawing Sheets

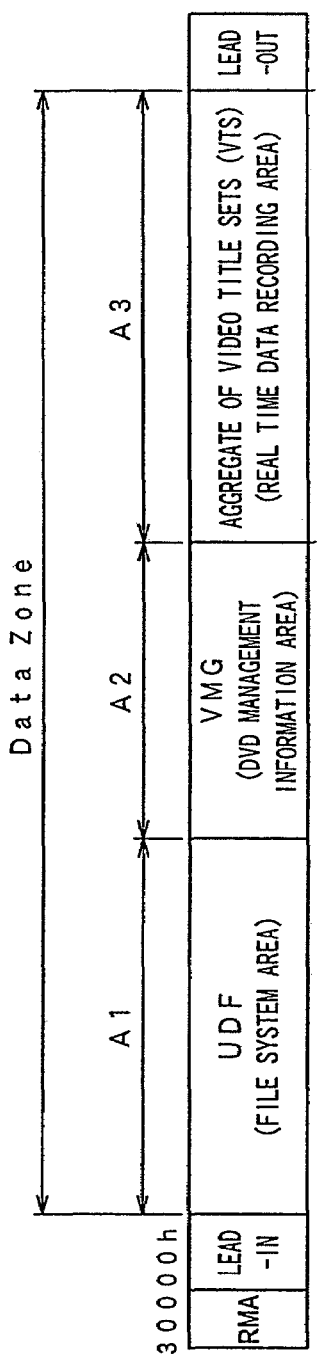
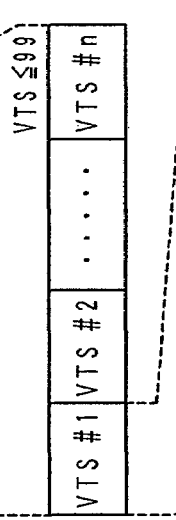
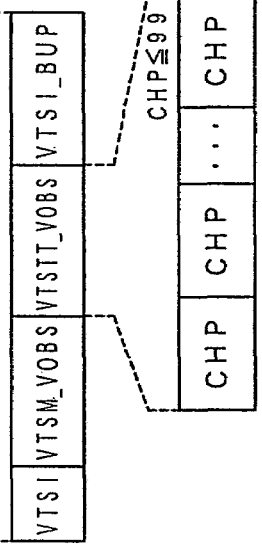
FIG. 1A
FIG. 1B
FIG. 1C
FIG. 1D
RELATED ART

FIG.2A

| Rzone 1 | Rzone 2 | Invisible Rzone |

FIG.2B

| Rzone 1 | Rzone 2 | VTSTT_VOBS | VTSI_BUP | |

FIG.2C

| Rzone 1 | VTSI | VTSM_VOBS | VTSTT_VOBS | VTSI_BUP | |

FIG.2D

| Rzone 1 | VTS #1 | Rzone 3 | Invisible Rzone |

FIG.2E

| Rzone 1 | VTS #1 | Rzone 3 | VTSTT_VOBS | VTSI_BUP |

FIG.2F

| Rzone 1 | VTS #1 | VTSI | VTSM_VOBS | VTSTT_VOBS | VTSI_BUP |

FIG.2G

| Rzone 1 | VTS #1 | VTS #2 | ... |

FIG.2H

| LEAD-IN | UDF | VMG | VTS #1 | VTS #2 | ... | VTS #n | LEAD-OUT |

RELATED ART

RELATED ART

FIG.10A | Rzone 1 | Rzone 2 | Invisible Rzone

FIG.10B | Rzone 1 | Rzone 2 | VTSTT_VOBS | VTSI_BUP

FIG.10C | Rzone 1 | VTSI | TMP_VMGI | VTSTT_VOBS | VTSI_BUP

FIG.10D | Rzone 1 | VTS #1 | Rzone 3 | Invisible Rzone

FIG.10E | Rzone 1 | VTS #1 | Rzone 3 | VTSTT_VOBS | VTSI_BUP

FIG.10F | Rzone 1 | VTS #1 | VTSI | TMP_VMGI | VTSTT_VOBS | VTSI_BUP

FIG.10G | Rzone 1 | VTS #1 | VTS #2

FIG.10H | LEAD-IN | UDF | VMG | VTS #1 | VTS #2 | ... | VTS #n | LEAD-OUT

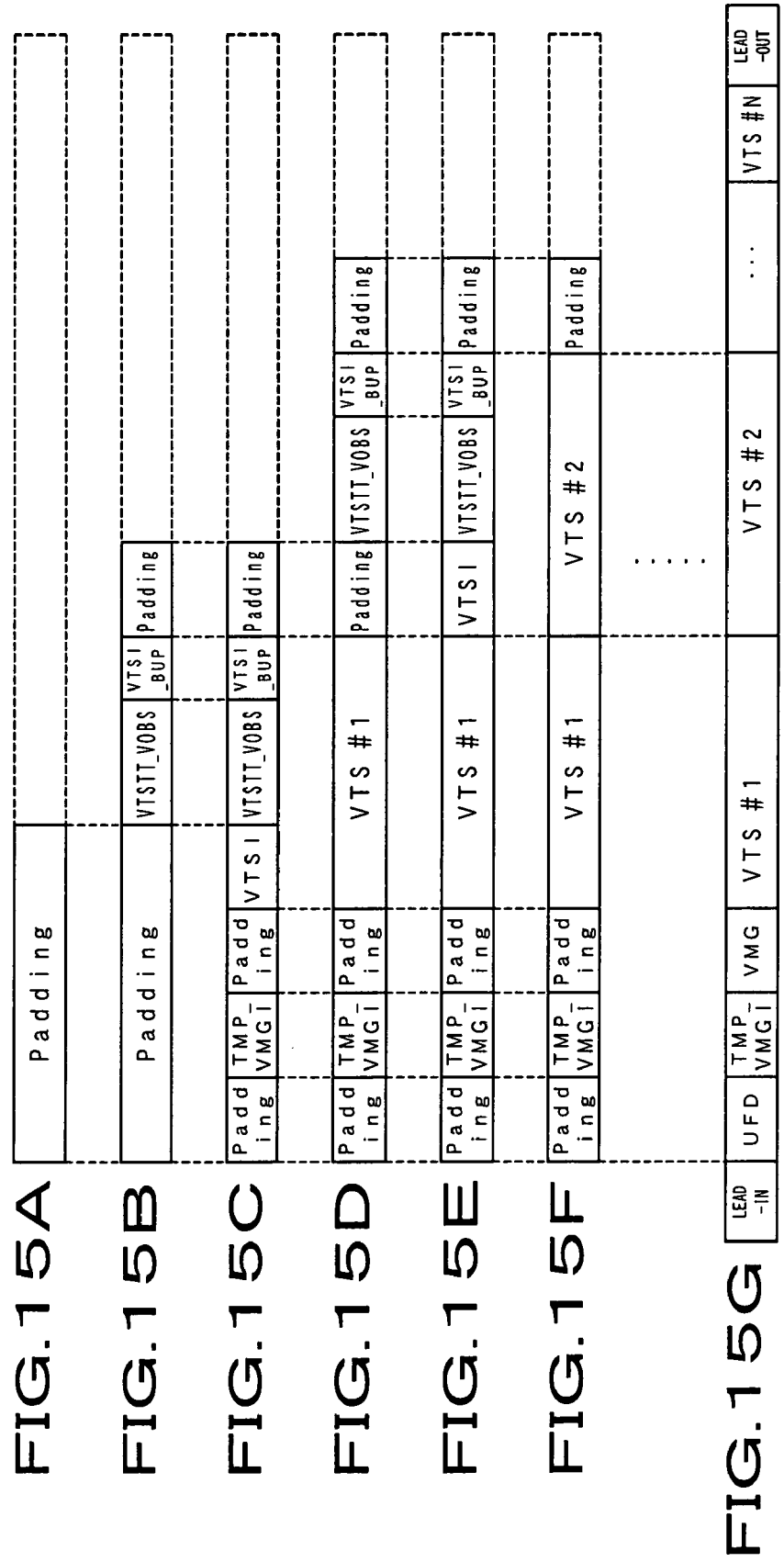

OPTICAL DISC RECORDING APPARATUS AND METHOD THEREOF

TECHNICAL FIELD

The present invention relates to an optical disc recording apparatus and method thereof for recording data on an optical disc capable of recording and reproducing data for DVD-R (DVD-Recordable), DVD-RW (DVD-Rewritable), or the like.

The present application clams priority from Japanese Patent Application No. 2002-378434 filed on Dec. 26, 2002, the content of which is hereby incorporated by reference into this application.

BACKGROUND ART

Presently, the DVD (Digital Versatile Disc), one of large-capacity optical discs, is available in the forms of: DVD-R (DVD-Recordable) capable of recording data; and DVD-RW (DVD-Rewritable), DVD-RAM (DVD-Random Access Memory), and the like capable of rewriting recorded data. Data recorded on DVD-R or DVD-RW cannot be reproduced on a reproducing apparatus, PC (personal computer), and the like compliant with only DVD-video formats because of format incompatibility. In order to allow the reproducing apparatus, PC, and the like to reproduce data recorded on the DVD-R or DVD-RW (hereafter referred to as the DVD-R/-RW), data recorded on the DVD-R/-RW needs to be converted into a specified format compliant with the DVD-video format. In order for the PC and the like to reproduce data recorded on the DVD-R/-RW, the data recorded on the DVD-R/-RW needs to comply with the Universal Disc Format (UDF) standard.

FIG. 1 shows a data structure of an optical disc that records data using a logical format compliant with the DVD-video format. As shown in FIG. 1A, an information recording surface on the optical disc compliant with the DVD-video format is divided into a lead-in area, a data zone, and a lead-out area from the innermost side. The data zone actually records intended real data.

The data zone is divided into three areas from the lead-in side: a UDF (Universal Disc Format) area A1, i.e., a file system area for describing a UDF bridge configuration; a VMG (Video Manager) area A2 as a DVD management information area; and a real time data recording area A3. The UDF area A1 and the VMG area A2 record information for managing video data recorded on the real time data recording area A3. The UDF area A1 is referred to as a first management information area. The VMG area A2 is referred to as a second management information area. The VMG area A2, i.e., the second management information area, corresponds to a file management system specific to the DVD-video format. The VMG area A2 records TOC (Table Of Contents), i.e., information to manage the whole of video data recorded in the real time data recording area A3. On the other hand, the UDF area A1, i.e., the first management information area, corresponds to a file management system specific to the PC and the like. The UDF area A1 uses a format such as UDF for compatibility with file systems for PC and the like to record information to manage the whole of video data recorded in the real time data recording area A3.

The real time data recording area A3 is a user area for recording real data such as motion pictures. As shown in FIG. 1B, motion pictures are recorded on the basis of VTS (Video Title Set). The VTS is referred to as a title. Up to 99 titles can be provided. As shown in FIG. 1C, the VTS comprises VTSI (Video Title Set Information), VTSM_VOBS (Video Object Set for the VTSM), VTSTT_VOBS (Video Object Set for Titles in a VTS), and VTSI_BUP (Backup of VTSI) from the beginning.

The VTSTT_VOBS records video data, i.e., actual data, according to the MPEG (Moving Picture Experts Group) 2 format. The VTSI records recording position information and the like, i.e., information for managing video data comprising actual data. The VTSM_VOBS records a title menu of the video data. The VTSM_VOBS is optional. The VTSI_BUP records backup data for VTSI. The VTSTT_VOBS comprises packetized data based on a specified amount. When data to be recorded comprises motion pictures, for example, the VTSTT_VOBS uses a chapter (CHP) as a reproduction unit and comprises a plurality of chapters (CHP) as shown in FIG. 1D.

When the PC or the like accesses an optical disc having the above-mentioned data structure, the UDF area A1 can be used to retrieve and reproduce an intended file. When a DVD player is used for reproduction, the VMG area A2 can be used to retrieve and reproduce an intended file.

There is available an Incremental Recording system (hereafter referred to as an INC system) or a Restricted Over Write system (hereafter referred to as an ROW system) as a recording system for writing motion pictures on such optical disc. The INC system is mainly used for DVD-R and the like and sequentially records motion pictures. The ROW system is mainly used for DVD-RW and the like and randomly records motion pictures. When data is recorded on an unrecorded area, even the ROW system needs to sequentially record motion pictures. The INC and ROW systems manage processes such as reservation on optical discs using an RMA (Recording Management Area) provided more inside than the lead-in area.

FIG. 2 shows a recording process according to the INC system. The INC system is defined to be able to write to up to three areas, i.e., each of these areas is referred to as Rzone. The RMA manages each Rzone area.

When recording a motion picture, the INC system first reserves the Rzone areas as shown in FIG. 2A. Here, the Rzone areas are reserved as follows. An area for Rzone 1 is defined so as to form the UDF area A1 and the VMG area A2, i.e., areas for recording the management information. An area for Rzone 2 is defined in the next unrecorded area to form the real time data recording area A3 so as to form the VTSI and the VTSM_VOBS of the first VTS. The remaining unrecorded area is defined to be an area for Invisible Rzone (Rzone 3). By reserving Rzone 1 and Rzone 2, the INC system ensures areas for recording the management information. It also ensures areas for forming the VTSI and the VTSM_VOBS of the first VTS.

The INC system sequentially records motion pictures from the beginning of the Invisible Rzone to form the VTSTT_VOBS comprising actual data. When a user's instruction completes recording of actual data for one VTS, the VTSI_BUP is recorded in succession to recording of the actual data as shown in FIG. 2B. Further, as shown in FIG. 2C, the system returns to the beginning and forms the VTSI and the VTSM_VOBS in the Rzone 2 to close it. In this manner, the INC system records one VTS on the optical disc.

FIG. 2D shows how the INC system records the next VTS successively. The system reserves the Rzone 3 in the remaining unrecorded area to ensure an area for the VTSI and the VTSM_VOBS and defines the Invisible Rzone. Then, as shown in FIG. 2E, the system records actual data to form the VTSTT_VOBS, and then forms the VTSI_BUP. As shown in FIG. 2F, the system forms the VTSI and the VTSM_VOBS in the previously ensured area. In this manner, successive VTS areas are recorded on the optical disc as shown in FIG. 2G. To successively record VTS, the INC system likewise defines an unrecorded area for successively recording VTS.

As mentioned above, the INC system successively records VTS's to form the real time data recording area A3 on the optical disc. Such optical disc requires format conversion by means of a closed session process and the like (hereafter referred to as a finalization process). Otherwise, the optical disc cannot be reproduced on a reproducing apparatus or the like that complies with only the DVD-video format. The following describes the finalization process with reference to FIG. 2H.

As shown in FIG. 2H, for example, the finalization process is used to form the UDF area A1 and the VMG area A2 in Rzone 1 on the optical disc. The lead-in area is formed on the innermost periphery. The lead-out area is formed on the outermost periphery. The finalization process can enable compatibility with read-only optical discs. To form the UDF area A1 and the VMG area A2, the system generates data to be recorded in the UDF area A1 and the VMG area A2 from data of the VTSI and the VTSM_VOBS in each VTS. The system records the generated data in Rzone 1 to close it.

FIG. 3 shows a recording process according to the ROW system. The ROW system performs padding to previously ensure areas for recording the lead-in area, the UDF area, the VMG area, and the VTSI and the VTSM_VOBS for the first VTS as shown in FIG. 3A. Here, the padding is a process to record dummy data such as NULL for ensuring areas.

After ensuring these areas, the ROW system sequentially records images as shown in FIG. 3B to form the VTSTT_VOBS comprising actual data. Upon completion of recording actual data for one VTS, the system then records the VTSI_BUP. The system performs the padding process to ensure areas for the VTSI and the VTSM_VOBS in the succeeding VTS. As shown in FIG. 3C, returning to the beginning, the system forms the VTSI and the VTSM_VOBS corresponding to the recording of this actual data. In this manner, the ROW system records one VTS on the optical disc.

To record the next VTS in succession, the ROW system, as shown in FIG. 3D, records actual data following the padding area formed by the immediately preceding VTS to form the VTSTT_VOBS and the VTSI_BUP. The padding process is performed to ensure areas for the VTSI and the VTSM_VOBS of the VTS to follow. As shown in FIG. 3E, the VTSI and the VTSM_VOBS are formed in succession. In this manner, the next VTS is recorded on the optical disc as shown in FIG. 3F. To further record the VTS, the ROW system likewise performs the padding process or the like to record the VTS successively.

As mentioned above, the ROW system successively records VTS's to form the real time data recording area A3 on the optical disc. Like the INC system, such optical disc requires format conversion by means of the finalization process and the like. Otherwise, the optical disc cannot be reproduced on a reproducing apparatus or the like that complies with only the DVD-video format. The following describes the finalization process with reference to FIG. 3G.

As shown in FIG. 3G, for example, the finalization process is used to form the UDF area and the VMG area in the area padded by the finalization process. The lead-in area is formed on the innermost periphery. The lead-out area is formed on the outermost periphery. The finalization process can enable compatibility with read-only optical discs.

FIG. 4 shows a data structure of the VMG in FIGS. 2H and 3G recorded by the finalization process. FIG. 4 represents the data structure of menu information (hereafter referred to as a main menu) for selecting each title (each VTS).

The VMG comprises VMGI (Video Manager Information) and VMGM_VOBS (Video Object Set for the VMG menu). The VMGI records a group of VMGM_PGCI (VMG Menu Program Chain Information), i.e., link information to each VTS menu. This information takes effect when selected between menu pages or from the main menu. Each VMGM_VOBS comprises a plurality of cells each of which corresponds to each main menu screen page. The cell records the following images in the MPEG (Motion Picture Experts Group) format: a menu screen background, a menu title, a thumbnail (hereafter referred to as a VTS thumbnail) created from a representative image of each VTS, a previous page button, a next page button, and the like. Further, the cell includes NV_PCK comprising PCI and DSI. The PCI includes HLI (Highlight Information). The HLI records information such as a VTS thumbnail position, a button position, a highlight color, highlight movement when a four-direction button is pressed, and the like.

For example, a main menu screen in FIG. 5 can be realized by appropriately recording the VMG having the above-mentioned structure. A menu key is used to call the menu screen. The four-direction key is used to move a highlight. An execution key is centered on the four-direction key and can be used to select one VTS thumbnail. The execution key can be also used to call the VTS menu (to be described) or switch between menu pages. Selecting the next page button displays the next main menu. Selecting the previous page button displays the most recent main menu. In the example of FIG. 5, one main menu contains six VTS thumbnails, but is not limited thereto.

FIG. 6 shows a data structure of the VTS in FIGS. 2C and 3C recorded when the VTS is closed. FIG. 6 shows the data structure of information about a menu (hereafter referred to as a VTS menu) for selecting each CHP included in the VTS.

The VTS comprises VTSI, VTSM_VOBS, VTSTT_VOBS, and VTSI_BUP. The VTSI records a group of VTSM_PGCI (VTS Menu Program Chain Information), i.e., link information to each CHP. This information takes effect when selected between menu pages or from the VTS menu. Each VTSM_VOBS comprises a plurality of cells each of which corresponds to each VTS menu screen page. The cell records the following images in the MPEG format: a menu screen background, a menu title, a thumbnail (hereafter referred to as a CHP thumbnail) created from a representative image of each CHP (to be described), a previous page button, a next page button, and the like. Further, the cell includes NV_PCK comprising PCI and DSI. The PCI includes HLI (Highlight Information). The HLI records information such as a CHP thumbnail position, a button position, a highlight color, highlight movement when a four-direction button is pressed, and the like.

For example, a VTS menu screen shown in FIG. 7 can be realized by appropriately recording the VTS having the above-mentioned structure. As mentioned above, the VTS menu can be selected from the main menu to call a VTS menu screen as shown in FIG. 7. The four-direction key is used to move a highlight on the called VTS menu screen. The execution key at the center of the four-direction key can be used to select one CHP thumbnail, reproduce or display a selected chapter (CHP), or switch between menu pages. Selecting the next page button displays the next VTS menu. Selecting the previous page button displays the immediately preceding VTS menu. In FIG. 7, one VTS menu contains six CHP thumbnails, but may be configured as described in Japanese Patent Publication No. 2875231.

As mentioned above, the DVD-video format has a limitation of up to 99 titles (VTS's) capable of being recorded on an optical disc. When one scene per title is recorded in compliance with the DVD-video format, only up to 99 scenes can be recorded on one optical disc. For example, let us assume that one scene is recorded five or six seconds. Then, one optical disc can just record scenes up to approximately eight minutes.

The DVD-video format is specified to be able to divide one title into 99 scenes or chapters (CHP). When data is recorded based on one scene per chapter, one optical disc can record 99×99=9801 scenes.

As shown in FIGS. 5 and 7, the DVD-video format creates menus in two layers independently of user's intentions. A scene (CHP) is divided into a plurality of VTS menus. In order to select an intended scene (CHP), the user first selects a VTS thumbnail from the main menu in FIG. 5 to call the VTS menu. The user then needs to select an intended CHP from the called VTS menu as shown in FIG. 7.

DISCLOSURE OF THE INVENTION

It is therefore an object of the present invention to provide an optical disc recording apparatus and a method thereof capable of complying with the above-mentioned DVD-video format, using data recording based on one scene per chapter, and directly linking to each CHP from a main menu.

To solve the above-mentioned problems, an optical disc recording apparatus according to the present invention records unit data generated by division based on a specified reproduction unit according to a specified format on an optical disc. The apparatus comprises: a unit data group formation section for forming a unit data group comprising at least one piece of unit data; a thumbnail image generation section for generating a thumbnail image for the unit data; a link information generation section for generating unit data link information to link with each unit data forming the unit data group; a data group generation section for generating a data group comprising a unit data group formed by the unit data group formation section and unit data link information generated by the link information generation section; and a closed session processing section for performing a closed session process so that other reproducing apparatuses can read an optical disc recording at least one data group. The closed session processing section generates a menu image including the thumbnail image based on the unit data, generates menu image link information for linking with the menu image, and records the menu image and the menu image link information on the optical disc.

To solve the above-mentioned problems, an optical disc recording method according to the present invention records unit data generated by division based on a specified reproduction unit according to a specified format on the optical disc. The method comprising the steps of: forming a unit data group comprising at least one piece of the unit data; generating a thumbnail image for unit data each time the unit data is recorded on the optical disc; generating unit data link information to link with each unit data forming the unit data group; generating a data group comprising the unit data group and the unit data link information; performing a closed session process so that other reproducing apparatuses can read an optical disc recording at least one data group. The closed session processing step generates a menu image including the thumbnail image based on the unit data, generates menu image link information for linking with the menu image, and records the menu image and the menu image link information on the optical disc.

Other and further objects and specific advantages of the present invention will appear more fully from the following description about examples.

BRIEF DESCRIPTION OF THE DRAWINGS

FIGS. 1A through 1D are views used for description of the DVD-video format;
FIGS. 2A through 2H are views used for description of INC recording;
FIGS. 10A through 10H are views used for description of recording a motion picture file according to the INC system in the optical disc recording and reproducing apparatus;
FIGS. 15A through 15G are views used for description of recording a motion picture file according to the ROW system in the optical disc recording and reproducing apparatus.

BEST MODE FOR CARRYING OUT THE INVENTION

Embodiments of the present invention will be described in further detail with reference to the accompanying drawings.

Figure 8:
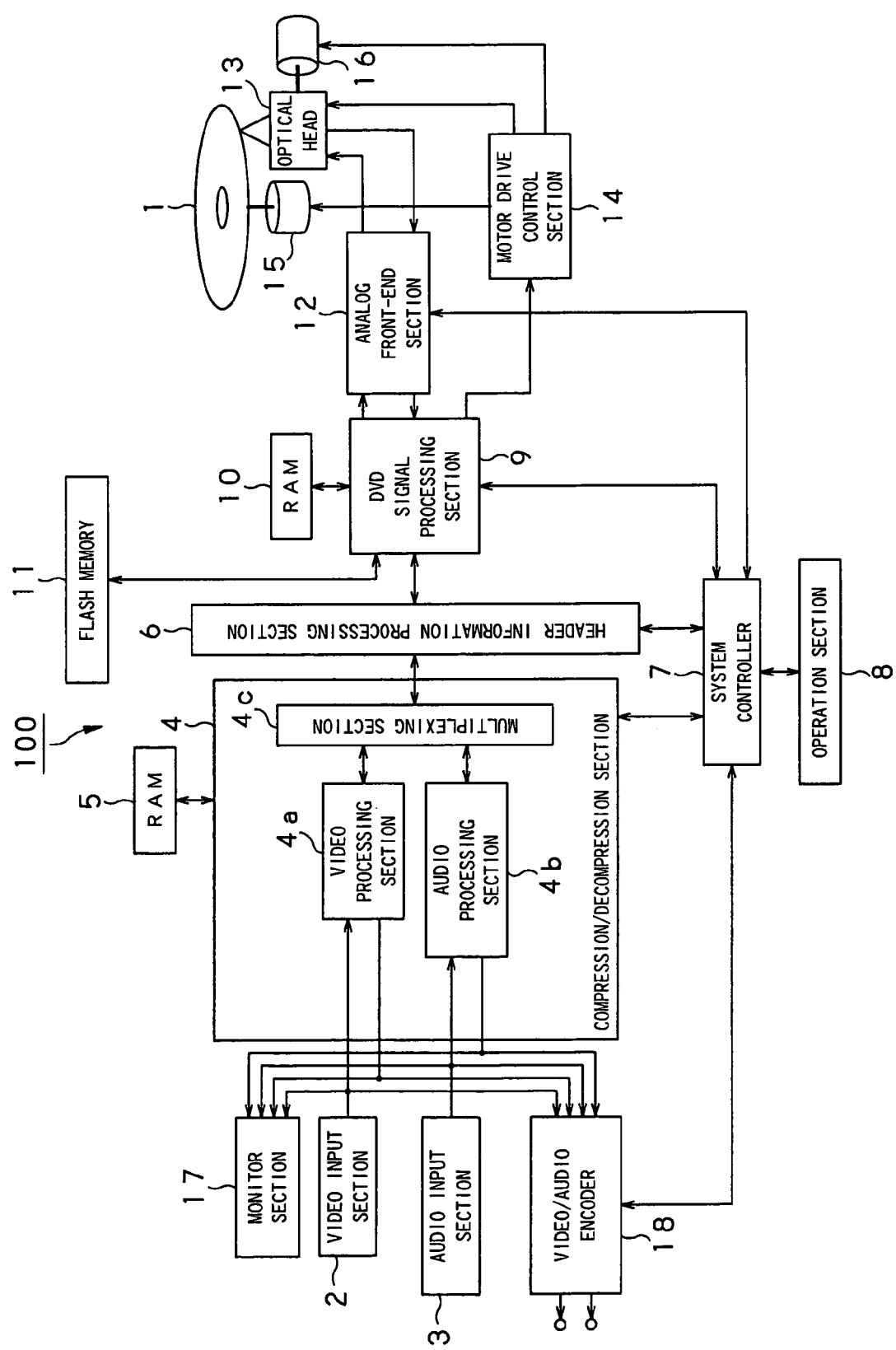
FIG. 8 is a block diagram showing configuration of an optical disc recording and reproducing apparatus according to the present invention.

The present invention is applicable to an optical disc recording and reproducing apparatus 100 having a configuration as shown in FIG. 8, for example.

The optical disc recording and reproducing apparatus 100 is a portable combination video recorder with built-in camera. The optical disc recording and reproducing apparatus 100 records imaging results on an optical disc 1 such as DVD-R (DVD-Recordable), DVD-RW (DVD-Rewritable), or the like. The INC system is used to record imaging results on DVD-R (DVD-Recordable). The ROW system is used to record imaging results on DVD-RW (DVD-Rewritable).

The optical disc recording and reproducing apparatus 100 comprises the following: a video input section 2 for supplying video signals, an audio input section 3 for supplying audio signals, a compression/decompression section 4 for compressing (during recording) and decompressing (during reproduction) video signals supplied from the video input section 2 and audio signals supplied from the audio input section 3, a random access memory (RAM) 5 for storing given data output from the compression/decompression section 4, a header information processing section 6 for attaching (during recording) header information and the like to data compressed by the compression/decompression section 4 and detaching (during reproduction) the header information and the like from data supplied from a DVD signal processing section 9, an operation section 8 for outputting given signals in accordance with user's operations, the DVD signal processing section 9 for performing a given conversion process for data supplied from the header information processing section 6 based on the DVD-video format, a RAM 10 for storing given data, a nonvolatile flash memory 11 for storing management information and the like, an analog front-end section 12 for controlling a light intensity of the optical head 4, an optical head 13 for irradiating a laser beam onto the optical disc 1, a spindle motor 15 for rotating the optical disc 1, a sled motor 16 for sledding the optical head 13, a motor drive control section 14 for controlling the optical head 13, the spindle motor 15, and the sled motor 16, a monitor section 17 for monitoring data, a video/audio encoder 18 for converting video data and audio data into a specified format and outputting the data to external devices, and a system controller 7 for controlling the compression/decompression section 4, the header information processing section 6, the DVD signal processing section 9, the analog front-end section 12, and the video/audio encoder 18.

The compression/decompression section 4 comprises the following: a video processing section 4a for compressing video data supplied from the video input section 2, an audio processing section 4b for compressing audio signals supplied from the audio input section 3, a multiplexing section 4c connected to the video processing section 4a and the audio processing section 4b for time-division multiplexing compressed video data and audio data and outputs these compressed data to the header information processing section 6.

In the optical disc recording and reproducing apparatus 100, the video input section 2 is supplied with a video signal as an imaging result from an imaging means (not shown) or a video signal from an external device. The video input section 2 converts the input video signal into a digital signal to generate video data. The video input section 2 then supplies the generated video data to the compression/decompression section 4, the monitor section 17, and the video/audio encoder 18. The built-in imaging means, though not shown, outputs an imaging result as a motion picture under control of the system controller 7. The video input section 2 is supplied with video data as motion pictures in accordance with control of the imaging means by the system controller 7.

The audio input section 3 converts an audio signal obtained from a microphone or from an external input into a digital signal to generate audio data. The audio input section 3 then supplies the generated audio data to the compression/decompression section 4, the monitor section 17, and the video/audio encoder 18.

The compression/decompression section 4 changes its operation under control of the system controller 7. During recording, the compression/decompression section 4 compresses and multiplexes video data and audio data using the RAM 5 and outputs the processed data to the header information processing section 6. During reproduction, the compression/decompression section 4 separates the data obtained from the header information processing section 6 into the video data and the audio data using the RAM 5. The compression/decompression section 4 decompresses the video data and the audio data and outputs them to the video/audio encoder 18.

During recording, the video processing section 4a in the compression/decompression section 4 compresses video data output from the video input section 2 and outputs the compressed video data under control of the system controller 7. When the video data is a motion picture, the data is compressed in the MPEG2 format. During reproduction, the video processing section 4a decompresses the video data output from the multiplexing section 4c according to the data compression format. During recording, the audio processing section 4b compresses and outputs the audio data supplied from the audio input section 3 according to the format such as MPEG, Dolby audio, or linear PCM. During reproduction, the audio processing section 4b decompresses and outputs the audio data obtained from the multiplexing section 4c. During recording, the multiplexing section 4c time-division multiplexes video data output from the video processing section 4a and audio data output from the audio processing section 4b and outputs the time-division multiplexed data to the header information processing section 6. During reproduction, the multiplexing section 4c separates the video data and the audio data from the time-division multiplexed data output from the header information processing section 6. The multiplexing section 4c then outputs the video data to the video processing section 4a and the audio data to the audio processing section 4b.

During recording, the header information processing section 6 receives the time-division multiplexed data from the compression/decompression section 4. Under control of the system controller 7, the header information processing section 6 attaches DVD-specific header information, extended file's header information or the like to the received data and outputs it. Based on the information from the system controller 7, the header information processing section 6 generates data such as UDF, VMG, and VTSI and outputs these data to the DVD signal processing section 9. During reproduction, the header information processing section 6 separates the header information attached during the recording from the data output from the DVD signal processing section 9 and outputs the header information to the compression/decompression section 4. Further, the header information processing section 6 notifies the separated header information to the system controller 7. An extended file signifies a file not defined by the DVD-video format, i.e., a standardized format for the optical disc 1. The extended file may include a still picture file, for example.

During recording, the DVD signal processing section 9 uses the RAM 10 to generate an error correction code from output data from the header information processing section 6. The DVD signal processing section 9 then provides the error correction code to the output data. The DVD signal processing section 9 performs a scramble process, an 8/15 modulation, and the like, and outputs the process result in a serial data string to the analog front-end section 12. Further, the DVD signal processing section 9 reads reproduction management information stored in the RAM 10 and stores the read reproduction management information in the flash memory 11. The flash memory 11 may be replaced by other nonvolatile storage media.

During reproduction, the DVD signal processing section 9 operates reversely to the recording operation. That is to say, the DVD signal processing section 9 decodes, descrambles, and error-corrects output data from the analog front-end section 12. The DVD signal processing section 9 then outputs the process result to the header information processing section 6. The system controller 7 outputs various types of drive information for spindle control, tracking control, focus control, and sled control. The DVD signal processing section 9 digital-analog converts these types of information to generate corresponding drive signals. The DVD signal processing section 9 then outputs the generated drive signals to the motor drive control section 14.

The analog front-end section 12 generates and outputs a light intensity control signal for a laser beam irradiated from the optical head 13 to the optical disc 1. During reproduction, the analog front-end section 12 uses the light intensity control signal to constantly supply a specified light intensity to the laser beam irradiated from the optical head 13 to the optical disc 1. During recording, the analog front-end section 12 changes a signal level of the light intensity control signal according to output data from the DVD signal processing section 9. In this manner, the analog front-end section 12 intermittently raises the light intensity from that for reproduction to that for recording according to output data from the DVD signal processing section 9.

The analog front-end section 12 obtains a light receiving result of return light from the optical head 13. The analog front-end section 12 amplifies and processes the light receiving result to generate a reproduction signal whose signal level varies with a sequence of pits formed on the optical disc 1. The analog front-end section 12 applies a specified process to this reproduction signal to generate reproduction data as a binary identification result. The analog front-end section 12 then outputs the reproduction data to the DVD signal processing section 9. By means of the process, the analog front-end section 12 generates a tracking error signal, a focus error signal, and the like whose signal levels vary with the tracking error amount and the focus error amount. The analog front-end section 12 outputs these signals as digital signals to the system controller 7.

The optical head 13 irradiates a laser beam from a built-in semiconductor laser according to the light intensity control signal output from the analog front-end section 12. Via an objective lens, the optical head 13 focuses the laser beam on an information recording surface of the optical disc 1. When the laser beam is irradiated onto the optical disc 1 to obtain the return light, the optical head 13 guides the return light to a specified light receiving element via the objective lens. The optical head 13 outputs a light receiving result from the light receiving element to the analog front-end section 12. The optical head 13 allows the objective lens to be moved by an actuator that is driven by a drive signal for tracking control and a drive signal for focus control. In this manner, the optical head 13 is capable of tracking control and focus control. The light intensity control signal intermittently raises the light intensity of the laser beam. Thus, the optical head 13 records intended data by locally increasing the temperature on the information recording surface of the optical disc 1.

The motor drive control section 14 uses various drive signals output from the DVD signal processing section 9 to control driving of the optical head 13, the spindle motor 15, and the sled motor 16. Of these drive signals, the motor drive control section 14 uses the drive signal for spindle control to drive the spindle motor 15. The motor drive control section 14 uses the drive signal for sled control to drive the sled motor 16. The motor drive control section 14 uses the drive signals for tracking control and focus control to drive the actuator mounted on the optical head 13.

The spindle motor 15 chucks the optical disc 1 and rotatively drives it at a specified rotation speed. The sled motor 16 moves the optical head 13 along the radial direction of the optical disc 1.

The monitor section 17 comprises a display mechanism and an audio process mechanism. The display mechanism and the audio process mechanism monitor video data input from the video input section 2, audio data input from the audio input section 3, or video data and audio data output from the compression/decompression section 4. The optical disc recording and reproducing apparatus 100 can monitor imaging results and reproduction results using the monitor section 17.

Using a specified format, the video/audio encoder 18 compresses video data and audio data input from the video input section 2 and the audio input section 3. Alternatively, the video/audio encoder 18 compresses video data and audio data output from the compression/decompression section 4 using a specified format. The compressed data is output to external devices. In this manner, the optical disc recording and reproducing apparatus 100 can monitor imaging results and reproduction results using external devices.

The system controller 7 comprises a computer that controls an overall operation of the optical disc recording and reproducing apparatus 100. The system controller 7 executes a processing program previously installed in the optical disc recording and reproducing apparatus 100. In this manner, the system controller 7 controls operations of the respective parts according to user's operation inputs obtained from the operation section 8 and various signals detected by the analog front-end section 12. That is to say, the system controller 7 generates drive information for tracking control and focus control from a tracking error signal and a focus error signal detected in the analog front-end section 12. The DVD signal processing section 9 converts the drive information into analog signals and outputs the signals to the motor drive control section 14. In this manner, the system controller 7 performs processes for tracking control and focus control. The system controller 7 detects a laser beam irradiation position according to header information and the like detected by the header information processing section 6. Based on the detection result, the system controller 7 generates drive information for sled control and outputs it to the DVD signal processing section 9 to perform processes such as a seek. Likewise, the system controller 7 performs processes for spindle control.

Figure 9:
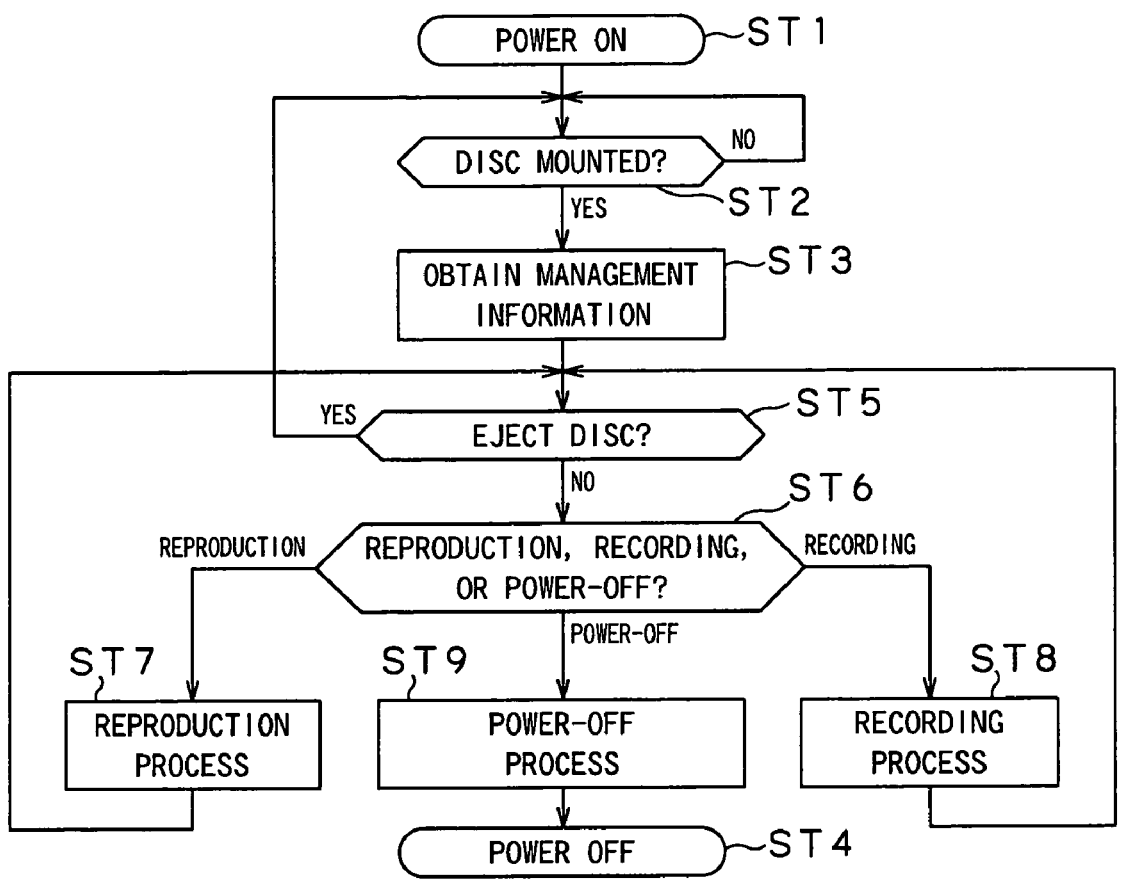
FIG. 9 is a flowchart showing a process performed at power-on sequence in the optical disc recording and reproducing apparatus.

When the power is turned on, the optical disc recording and reproducing apparatus 100 performs a process as shown with a flowchart in FIG. 9 for the optical disc 1. A DVD-R is used as the optical disc 1 in the following process.

When the power is turned on, the system controller 7 proceeds to step ST2 from step ST1. According to a detection result by a detection mechanism (not shown) of the optical disc 1, it is determined whether or not the optical disc 1 is mounted. When the result shows that the optical disc 1 is not mounted, the system controller 7 repeats step ST2.

On the contrary, the power may be supplied with the optical disc 1 mounted. Alternatively, the optical disc 1 may be mounted after the power is supplied. In such case, the result at step ST2 shows that the optical disc 1 is mounted. The process proceeds to step ST3 from step ST2. If the power is turned off while step ST2 is repeated, the system controller 7 directly proceeds to step ST4 to terminate the process.

At step ST3, the system controller 7 drives the sled motor 16 to move the optical head 13 to the innermost periphery of the optical disc 1. The system controller 7 obtains a reproduction result at the innermost periphery from the DVD signal processing section 9 to obtain VMG data. This case applies to the finalized optical disc 1. When the optical disc 1 is not finalized yet, no VMG data is generated. Accordingly, the system controller 7 obtains information about the RMA. The information about the RMA may be used to determine that data is already recorded in the real time data recording area A3 of the optical disc 1. In such case, the system controller 7 searches the optical disc 1 to obtain the VTSI and TMP_VMGI data in each VTS. In this manner, the system controller 7 is configured to obtain such management information about the optical disc 1 as needed for its recording and reproduction similarly to an optical disc apparatus that records and reproduces ordinary DVD discs.

The following describes the TMP_VMGI. The TMP_VMGI is a temporary VMGI that is recorded together with the VTSI at termination of recording one VTS. The TMP_VMGI contains information such as the number of VTS's recorded on the optical disc 1, disc name information, physical positions of 99 VTS's, VTS name information, and the like. At the time of recording the TMP_VMGI, it contains the latest information about all VTS's that have been recorded so far. When a plurality of VTS's is recorded on the DVD-R disc, the TMP_VMGI is recorded for each VTS. The TMP_VMGI at the outermost periphery becomes the latest one and contains the information about all generated VTS's. It should be noted that the TMP_VMGI data is outside the DVD-video format specification.

During this process, the system controller 7 obtains UDF data in addition to VMG data. When the TMP_VMGI is recorded during reproduction of the real time data recording area A3, the system controller 7 obtains the TMP_VMGI as well. In this manner, the system controller 7 can reproduce an extended file not defined in the DVD-video format from the optical disc 1. The system controller 7 can also obtain the management information about the extended file. The system controller 7 records a series of thus far obtained management information in the built-in memory for storage.

The system controller 7 then proceeds to step ST5 to determine whether or not a user enters an instruction (EJECT) to eject the optical disc 1. If the result is affirmative, the system controller 7 instructs a loading mechanism (not shown) to eject the optical disc 1, and then returns to step ST2.

On the other hand, when the user enters an instruction other than to eject the optical disc 1, the system controller 7 proceeds to step ST6 from step ST5. The system controller 7 determines whether the user's instruction is REC for recording, PB for reproduction, or Power OFF to turn the power off. If the user instructs the reproduction, the system controller 7 proceeds to step ST7 from step ST6. The system controller 7 performs a specified process to reproduce files recorded on the optical disc 1, and then returns to step ST5.

If the user instructs the recording, the system controller 7 proceeds to step ST8 from step ST6. The system controller 7 performs a specified process to record motion pictures on the optical disc 1, and then returns to step ST5. There may be a case where the optical disc 1 is finalized so that it cannot record data while the UDF and the VMG are formed. In such case, the system controller 7 omits the recording process and returns to step ST5.

If the user instructs to turn the power off, the system controller 7 proceeds to step ST9 from step ST6. The system controller 7 performs a process to turn the power off, and then proceeds to step ST4 to terminate the process.

During the recording process among the others that are performed as mentioned above, the system controller 7 records motion picture files according to the INC system on the optical disc 1 if it is DVD-R. The INC system sequentially records motion pictures. The INC system uses the RMA (Recording Management Area) provided more inside than the lead-in area to manage processes such as reservation on the optical disc.

As mentioned above, the DVD-video format has a limitation of up to 99 VTS's capable of being recorded on the optical disc 1. When one scene per VTS is recorded in compliance with the DVD-video format, only up to 99 scenes can be recorded on one optical disc. For example, let us assume that one scene is recorded five or six seconds. Then, one optical disc can just record scenes up to approximately eight minutes.

The DVD-video format is specified to be able to divide one title into 99 scenes or chapters (CHP). When data is recorded based on one scene per chapter, one optical disc can record 99×99=9801 scenes. It should be noted that one chapter signifies a given reproduction unit.

Figure 3A:
FIGS. 3A through 3G are views used for description of ROW recording.
Figure 3B:
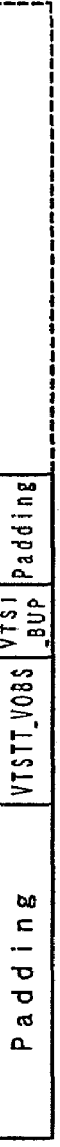
Figure 3C:
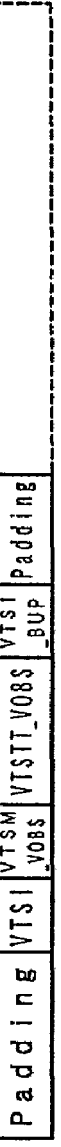
Figure 3D:
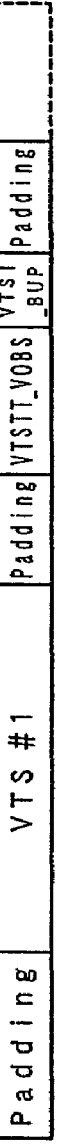
Figure 3E:
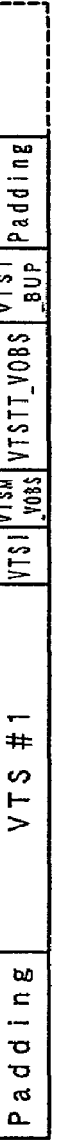
Figure 3F:
Figure 3G:
Figure 4:
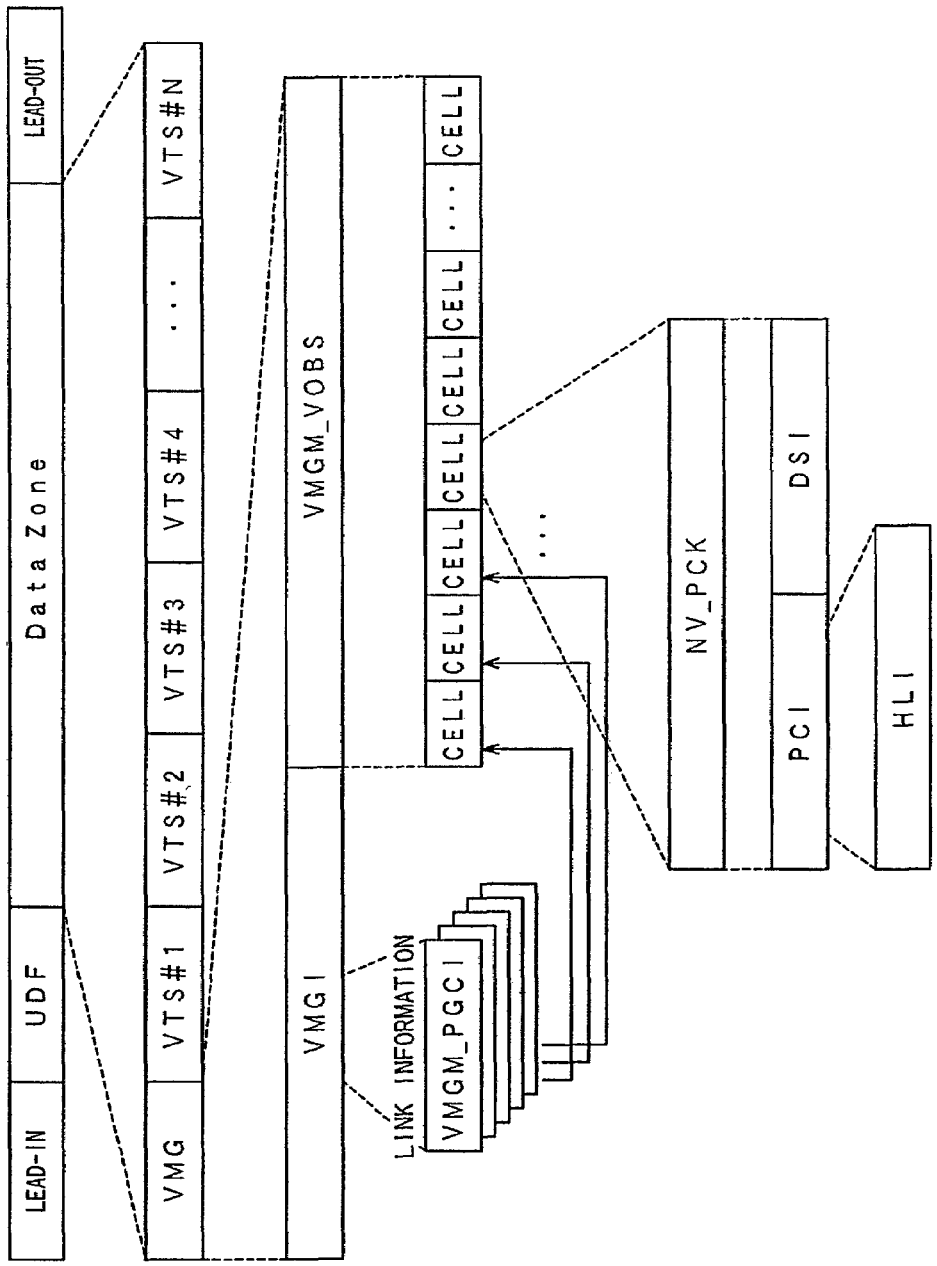
FIG. 4 schematically shows a VMG data structure.
Figure 5:
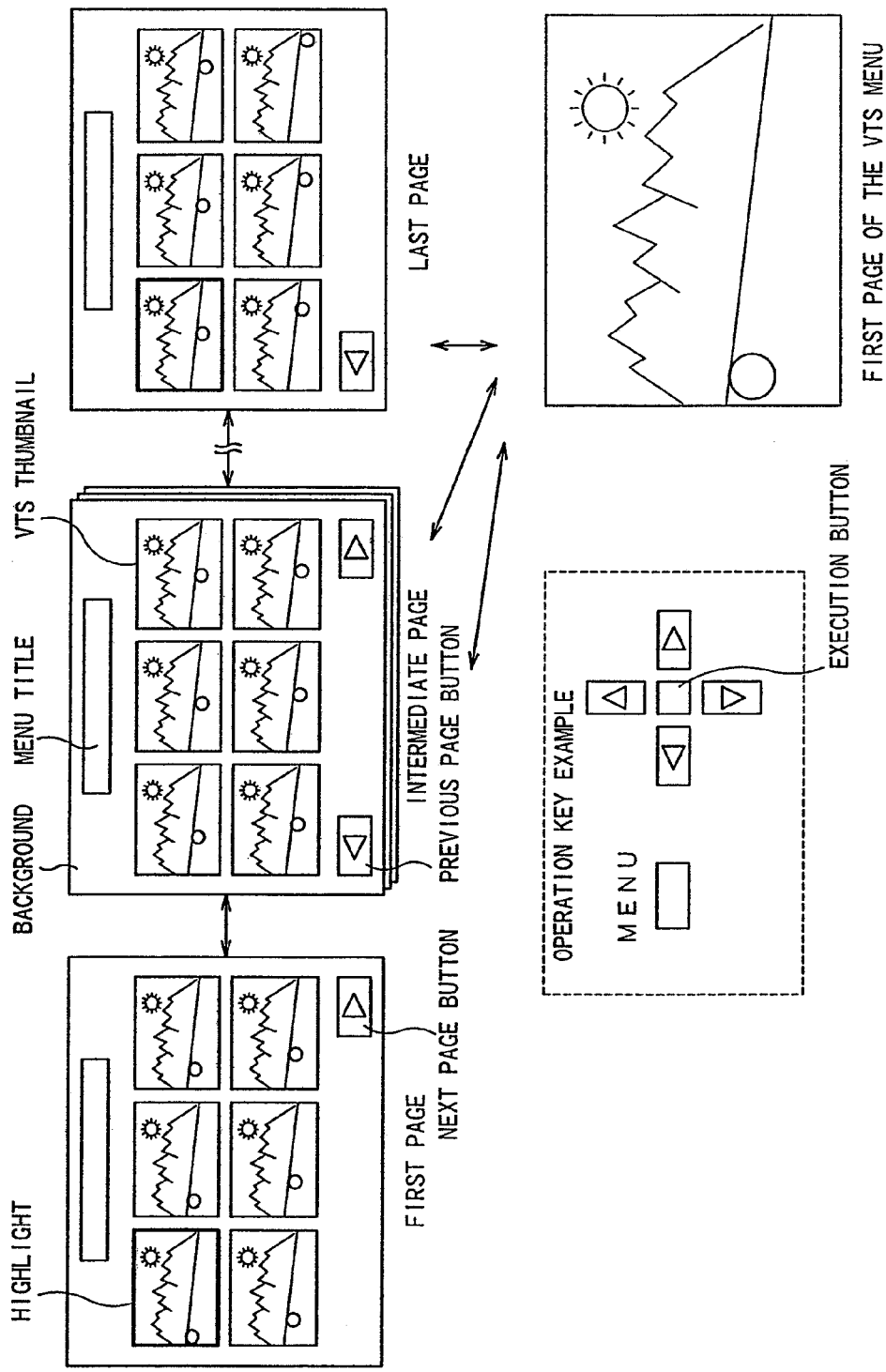
FIG. 5 shows a display example of a main menu screen.
Figure 6:
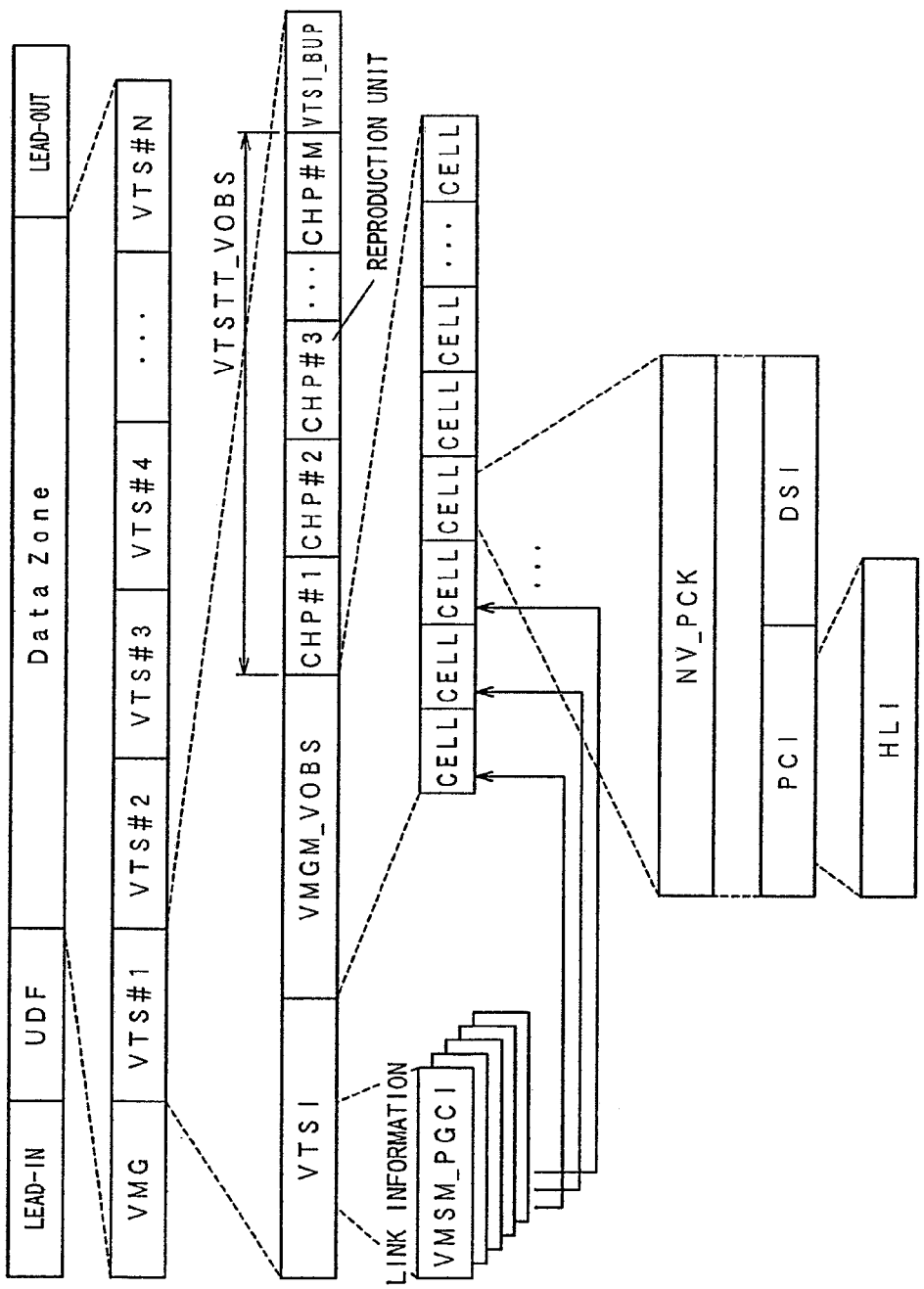
FIG. 6 schematically shows a VTS data structure.
Figure 7:
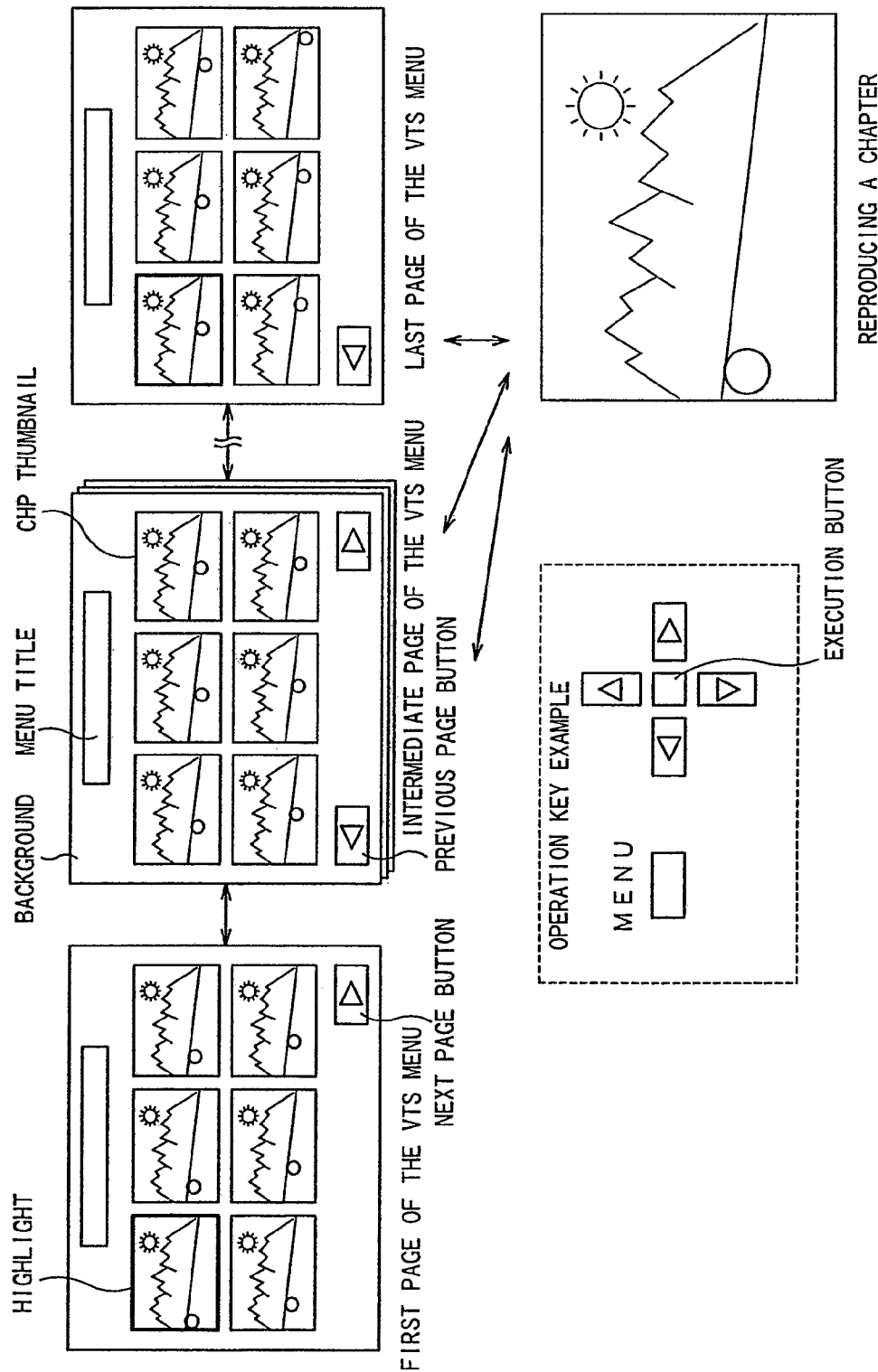
FIG. 7 shows a display example of a VTS menu screen.

As shown in FIGS. 5 and 7, the DVD-video format creates menus in two layers independently of user's intentions. A scene (CHP) is divided into a plurality of VTS menus. In order to select an intended scene (CHP), the user first selects a VTS thumbnail from the main menu to call the VTS menu. The user then needs to select an intended CHP from the called VTS menu.

To solve this problem, the optical disc recording and reproducing apparatus 100 according to the present invention uses the recording method based on one scene per chapter. Further, the optical disc recording and reproducing apparatus 100 records data so as to be able to select a scene (CHP) with a single step. Referring now to FIG. 10, the following describes a data structure for recording motion picture files and still picture files on the optical disc 1 on the basis of one scene per chapter. The example in FIG. 10 uses a so-called virgin disc, i.e., the optical disc 1 having no files recorded on it. FIG. 10 is used to explain the process of recording motion picture files and still picture files based on the above-mentioned INC system.

The INC system defines that up to three areas can be written at a time. These areas are referred to as Rzone. The RMA manages each Rzone.

As shown in FIG. 10A, the process first reserves Rzone. The Rzone reservation takes place as follows. The process defines an area for Rzone 1 to form the UDF and the VMG, i.e., areas for recording the management information. The process then defines an area for Rzone 2 to form the VTSI (including CHP information) for the first VTS in an unrecorded area for forming the real time data recording area. The process defines the remaining unrecorded area to be an area for Invisible Rzone (Rzone 3). The INC system reserves Rzone 1 and Rzone 2 to ensure the area for recording the management information and the area for forming the VTSI for the first VTS.

The INC system sequentially records motion pictures from the beginning of the Invisible Rzone to form the VTSTT_VOBS, i.e., actual data, as shown in FIG. 10B. When a user instruction completes the recording of actual data for one VTS, the process records the VTSI_BUP after recording of the VTSTT_VOBS. As shown in FIG. 10C, the process returns to Rzone 2, and forms the VTSI and the TMP_VMGI to close Rzone 2. At this time, the first VTS#1 is complete.

The next VTS is recorded as shown in FIG. 10D. In this case, the INC system reserves Rzone 3 in the remaining unrecorded area to ensure areas for the VTSI and the TMP_VMGI, thus defining the Invisible Rzone. As shown in FIG. 10E, the process further records actual data to form the VTSTT_VOBS, and then the VTSI_BUP. As shown in FIG. 10F, the process forms the VTSI and the latest TMP_VMGI in the previously ensured areas. In this manner, the optical disc records VTS#2 next to VTS#1 as shown in FIG. 10G. To further records VTS's, the INC system likewise defines an unrecorded area for sequentially recording VTS's.

As mentioned above, the INC system successively records VTS's to form the real time data recording area A3 on the optical disc. Such optical disc requires format conversion by means of a closed session process and the like (hereafter referred to as a finalization process). Otherwise, the optical disc cannot be reproduced on a reproducing apparatus or the like that complies with only the DVD-video format. The following describes the finalization process with reference to FIG. 10H.

As shown in FIG. 10H, for example, the finalization process is used to form the UDF and the VMG in Rzone 1 on the optical disc. The lead-in area is formed on the innermost periphery. The lead-out area is formed on the outermost periphery. The finalization process can enable compatibility with read-only optical discs. The system generates data to be recorded in the UDF and the VMG based on the VTSI and TMP_VMGI data for each VTS, and records the generated data in Rzone 1 to close it.

Figure 11:
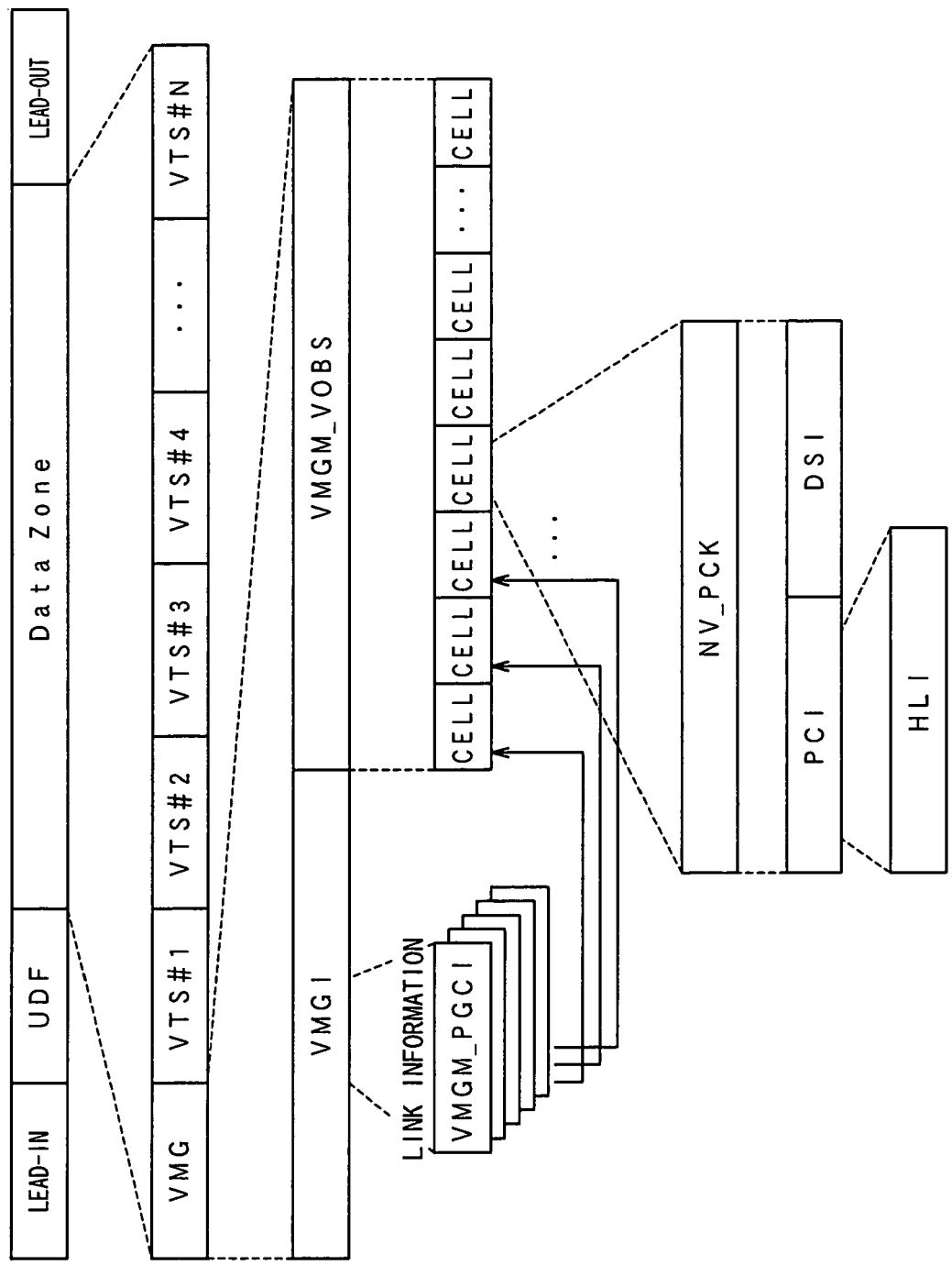
FIG. 11 schematically shows the VMG data structure.

FIG. 11 shows the data structure of the VMG recorded by the finalization process in FIG. 10H. FIG. 11 shows the data structure of menu (hereafter referred to as the direct menu) information capable of directly selecting CHP included in the VTS.

The VMG comprises VMGI (Video Manager Information) and VMGM_VOBS (Video Object Set for the VMG menu). The VMGI records a group of VMGM_PGCI (VMG Menu Program Chain Information), i.e., link information to CHP in the VTS. This information takes effect when selected between menu pages or from the direct menu. Each VMGM_VOBS comprises a plurality of cells each of which corresponds to each direct menu screen page. The cell records the following images in the MPEG (Motion Picture Experts Group) format: a direct menu screen background, a menu title, a thumbnail (hereafter referred to as a CHP thumbnail) created from a representative image of each CHP, a previous page button, a next page button, and the like. Further, the cell includes NV_PCK comprising PCI and DSI. The PCI includes HLI (Highlight Information). The HLI records information such as a CHP thumbnail position, a button position, a highlight color, highlight movement when a four-direction button is pressed, and the like.

Figure 12:
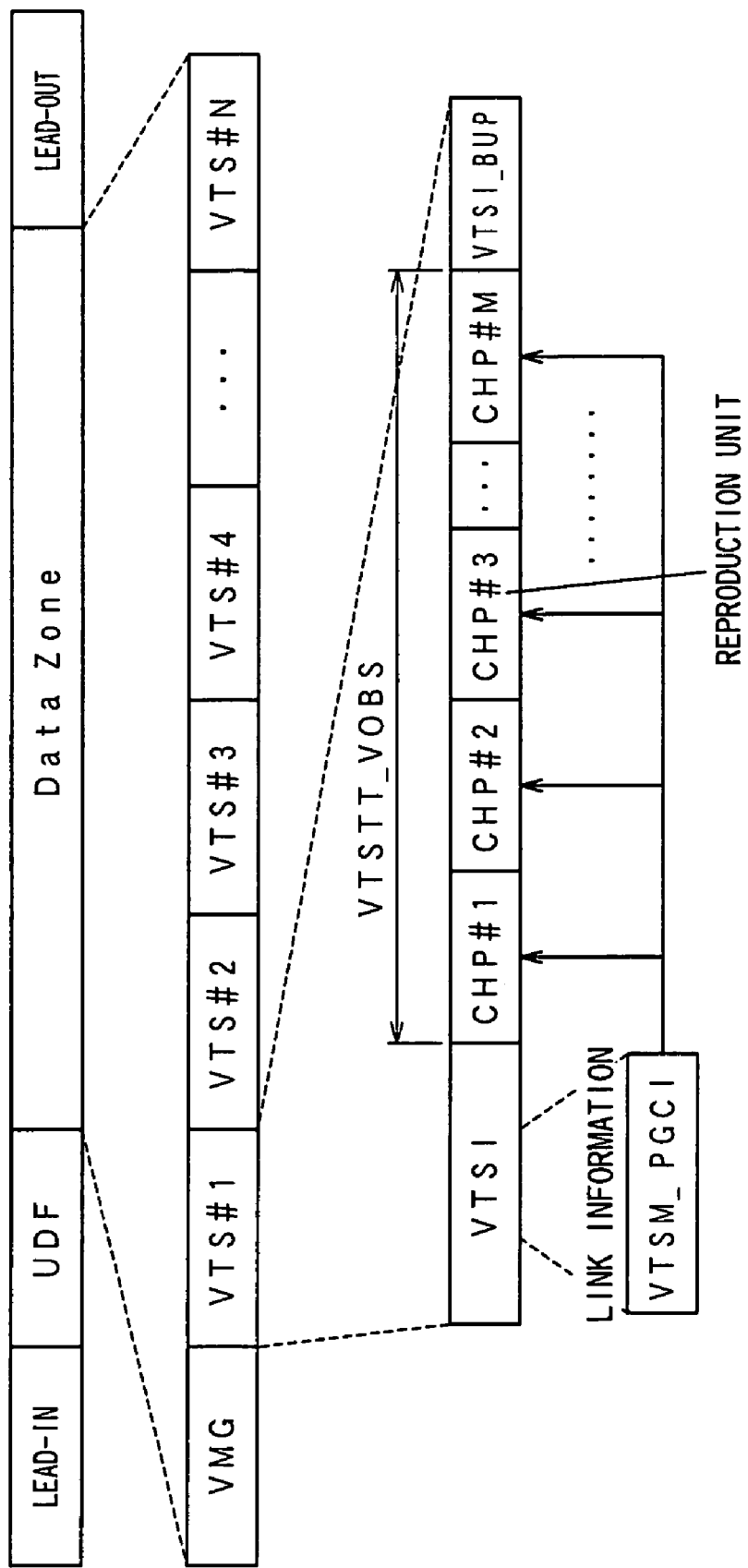
FIG. 12 schematically shows the VTS data structure.

In terms of the data structure, each VTS comprises VTSI, VTSTT_VOBS, and VTSI_BUP as shown in FIG. 12. The present invention does not record the VTSM_VOBS that is conventionally recorded next to the VTSI. The VTSI records VTSM_PGCI and the like, i.e., link information to each CHP. The link information takes effect when selected from the direct menu. The VTSTT_VOBS records actual data separated into a specified unit of reproduction, called a chapter (CHP).

Figure 13:
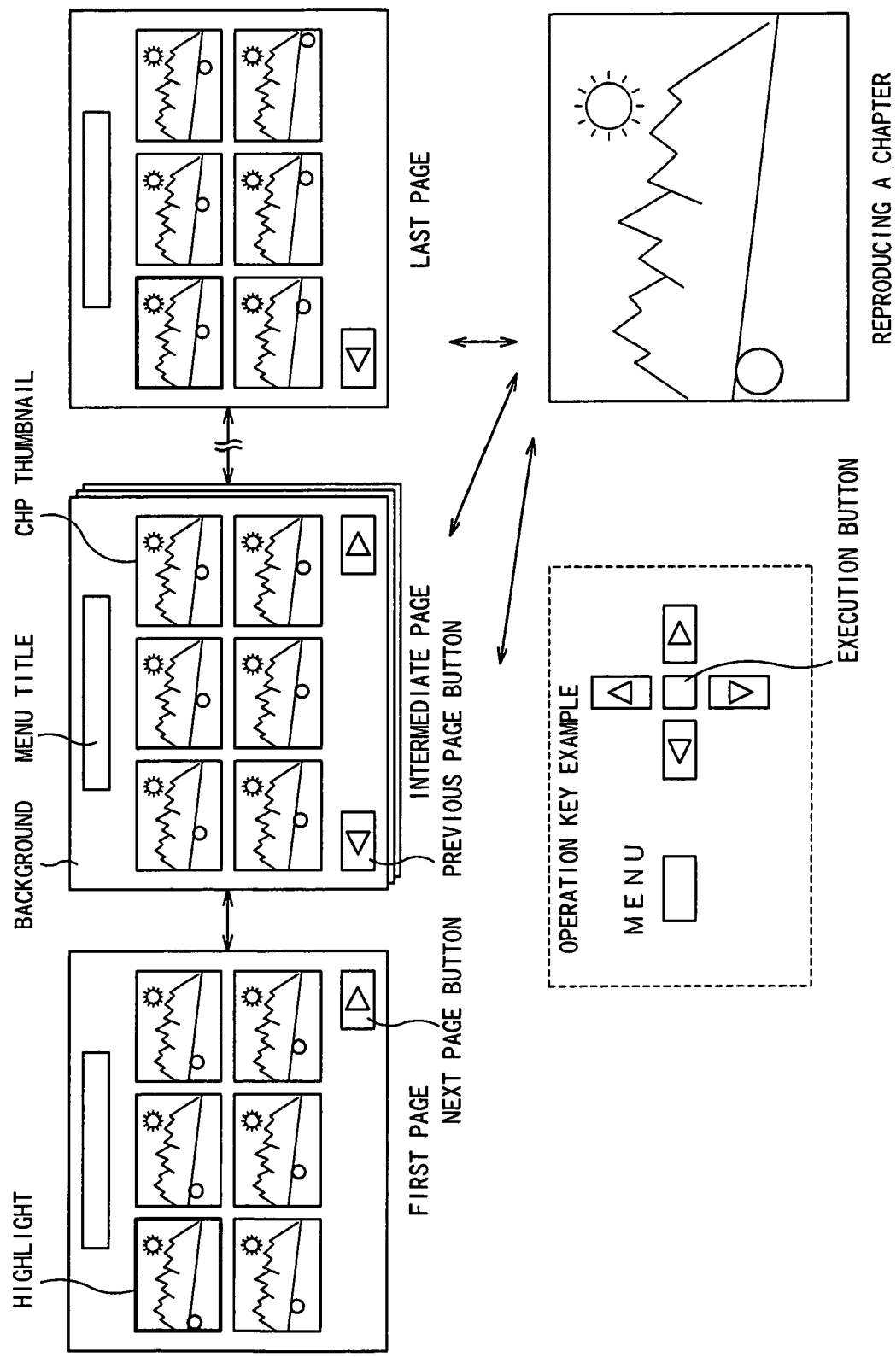
FIG. 13 shows a display example of a direct menu screen.

For example, a direct menu screen shown in FIG. 13 can be realized by appropriately recording the VMG and the VTS having the above-mentioned structure. The menu key is used to call the menu screen. The four-direction key is used to move a highlight. The execution key is centered on the four-direction key and can be used to select one CHP thumbnail. The execution key can be also used to reproduce and display the selected chapter (CHP) or switch between menu pages. Selecting the next page button displays the next direct menu. Selecting the previous page button displays the most recent direct menu. In the example of FIG. 13, one direct menu contains six CHP thumbnails, but is not limited thereto.

Figure 14:
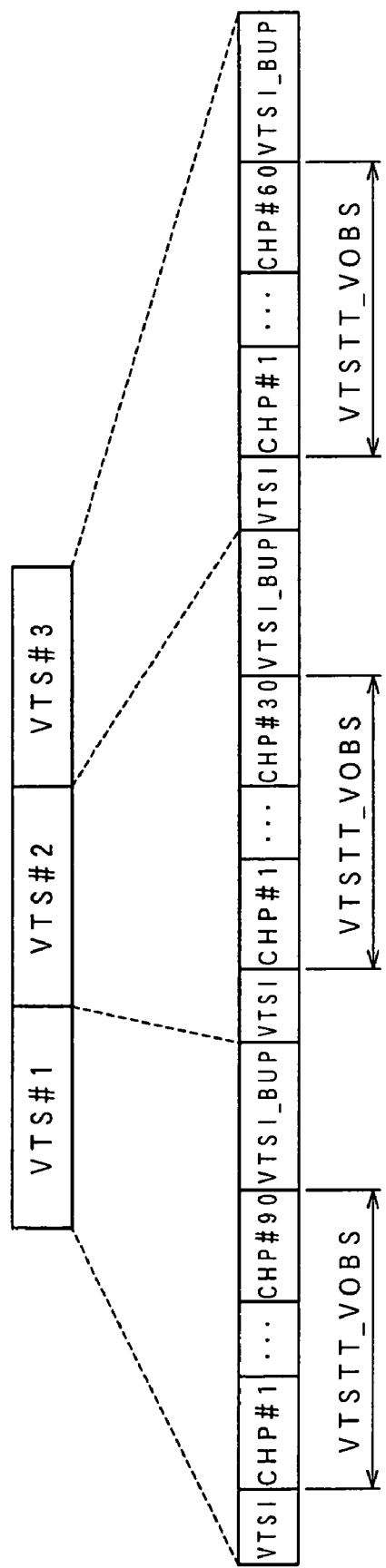
FIG. 14 schematically shows an example of the VTS data structure.

As shown in FIG. 14, VTS#1 through VTS#3 are recorded. VTS#1 records CHP1 through CHP90. VTS#2 records CHP1 through CHP60. VTS#3 records CHP1 through CHP30. The total number of chapters is 180. For example, the direct menu can display chapters (CHP) recorded in each VTS using sequence numbers CHP1 through CHP180. The user can select an intended chapter (CHP) according to the above-mentioned sequence numbers. When the user selects CHP100 from the direct menu, for example, CHP10 in the VTS#2 is selected automatically. Since VTS#1 records 90 chapters (CHP), the tenth chapter in VTS#2 is selected as CHP100. Therefore, the user can directly select an intended chapter (CHP) using the direct menu without needing to use two menus, i.e., the main menu and the VTS menu, as conventionally practiced.

When the optical disc 1 is DVD-RW, the system controller 7 records motion picture files using the ROW system. Referring now to FIG. 15, the following describes operations of the system controller 7. Like the INC system, the ROW system sequentially records motion pictures. The ROW system uses the RMA provided more inside than the lead-in area to manage processes such as reservation on the optical disc.

The ROW system performs padding to previously ensure areas for recording the lead-in area, the UDF area, the TMP_VMGI area, and the VMG and the VTSI for the first VTS as shown in FIG. 15A. Here, the padding is a process to record dummy data such as NULL for ensuring areas.

After ensuring these areas, the ROW system sequentially records images as shown in FIG. 15B to form the VTSTT_VOBS comprising actual data. Upon completion of recording actual data for one VTS, the system then records the VTSI_BUP. The system performs the padding process to ensure an area for the VTSI in the succeeding VTS. As shown in FIG. 15C, returning to the beginning, the system forms the VTSI corresponding to the recording of this actual data. At this time, the first VTS#1 is complete.

To record the second VTS#2 in succession, the ROW system, as shown in FIG. 15D, records actual data following the padding area formed by the immediately preceding VTS to form the VTSTT_VOBS and the VTSI_BUP. The padding process is performed to ensure an area for the VTSI of the VTS to follow. As shown in FIG. 15E, the VTSI is formed in succession. In this manner, the second VTS#2 is recorded on the optical disc as shown in FIG. 15F. To further record the VTS, the ROW system likewise performs the padding process or the like to record the VTS successively.

As mentioned above, the ROW system successively records VTS's to form the real time data recording area on the optical disc. Like the INC system, such optical disc requires format conversion by means of the finalization process and the like. Otherwise, the optical disc cannot be reproduced on a reproducing apparatus or the like that complies with only the DVD-video format. The following describes the finalization process with reference to FIG. 15G.

As shown in FIG. 15G, for example, the finalization process is used to form the UDF area and the VMG area in the area padded by the finalization process. The lead-in area is formed on the innermost periphery. The lead-out area is formed on the outermost periphery. The finalization process can enable compatibility with read-only optical discs. In FIG. 15G, the VMG's data structure recorded by the finalization process is the same as that shown in FIG. 11. The VTS's data structure is also the same as that mentioned above. Therefore, the user can directly select an intended chapter (CHP) using the direct menu without needing to use two menus, i.e., the main menu and the VTS menu, as conventionally practiced.

The VTS needs to be closed when the number of chapters (CHP) reaches 99 or when the power is turned off after the data recording. A conventional optical disc recording and reproducing apparatus records actual data on an optical disc and the VTSI_BUP in the RAM. The RAM is nonvolatile memory and loses the stored contents when the power is off. The VTSI_BUP needs to be recorded on the optical disc immediately before the power is off. At this time, the VTS is closed. Even if the recording method is based on one scene per chapter, repeating an operation of recording data and then turning the power off 99 times records 99 VTS's. This decreases the amount of data that can be recorded on one optical disc.

To solve this problem, the optical disc recording and reproducing apparatus 10 according to the present invention uses the flash memory 11 as nonvolatile memory to back up the VTSI_BUP stored in the RAM 10. If the power is off, the optical disc recording and reproducing apparatus 100 stores the VTSI_BUP in the flash memory 11. It is needless to worry about losing the VTSI_BUP. The VTS need not be closed each time the power is off, suppressing the consumption of VTS's.

Each time a chapter (CHP) is recorded on the optical disc 1, the optical disc recording and reproducing apparatus 100 may generate a thumbnail image and store the generated thumbnail image in the flash memory 11.

When generating the VMG, the finalization process creates the above-mentioned direct menu. When the direct menu is created, it is necessary to generate thumbnail images for all chapters (CHP). The conventional optical disc recording and reproducing apparatus reads a chapter (CHP) recorded on the optical disc 1 to generate a thumbnail image. As the number of chapters (CHP) increases, the more time is needed. The present invention solves this problem. Each time a chapter (CHP) is recorded on the optical disc 1, the corresponding thumbnail image is generated and is stored in the flash memory 11. This thumbnail image can be used during the finalization process. The finalization process can be performed fast.

The optical disc recording and reproducing apparatus 100 having the above-mentioned configuration uses the nonvolatile flash memory 11 and records data according to the DVD-video format on the basis of one scene per chapter. Therefore, the user can directly select an intended chapter (CHP) using the direct menu without needing to use two menus, i.e., the main menu and the VTS menu, as conventionally practiced. Further, the optical disc recording and reproducing apparatus 100 stores the VTSI_BUP in the flash memory 11 if the power is off. It is needless to worry about losing the VTSI_BUP. The VTS need not be closed each time the power is off, suppressing the consumption of VTS's. When recording a chapter (CHP) on the optical disc 1, the optical disc recording and reproducing apparatus 100 generates a thumbnail image and stores it in the flash memory 11. The optical disc recording and reproducing apparatus 100 uses the thumbnail image stored in the flash memory 11 during the finalization process. Accordingly, the finalization process can be performed fast.

An embodiment of the present invention is not limited to the above-mentioned example. A DVD-RAM may be used for the optical disc 1. While the optical disc recording and reproducing apparatus 100 according to the present invention is embodied as a portable combination video recorder with built-in camera (DC device), it may be embodied as an AC device.

It is further understood by those skilled in the art that the present invention is not limited to the above-mentioned examples with reference to the drawings and that various changes, modifications, and their equivalent may be made in the invention without departing from the appended claims and spirit thereof.

INDUSTRIAL APPLICABILITY

As mentioned above in detail, the optical disc recording apparatus according to the present invention records data according to the DVD-video format on the basis of one scene per chapter. Therefore, a user can directly select an intended chapter (CHP) using the direct menu without needing to use two menus, i.e., the main menu and the VTS menu, as conventionally practiced.

Further, the optical disc recording apparatus according to the present invention comprises nonvolatile memory to store the VTSI_BUP in the nonvolatile memory. If the power is off, it is needless to worry about losing the VTSI_BUP. The VTS need not be closed each time the power is off, suppressing the consumption of VTS's. When recording a chapter (CHP) on the optical disc, the optical disc recording apparatus generates a thumbnail image and stores it in the nonvolatile memory. The optical disc recording apparatus uses the thumbnail image stored in the nonvolatile memory during the finalization process. Accordingly, the finalization process can be performed fast.

The invention claimed is:

1. An optical disc recording apparatus to record unit data generated by division based on a specified reproduction unit according to a specified format on an optical disc, wherein the format is a DVD-video format, comprising:
   unit data group formation means for forming VTSTT_VOBS as a unit data group comprising at least one piece of unit data,
   wherein the unit data is a chapter (CHP);
   thumbnail image generation means for generating a CHP thumbnail image for the unit data;
   link information generation means for generating unit data link information included in VTSM_PGCI to link with each unit data forming the unit data group VTSTT_VOBS;
   data group generation means for generating VTS as a data group comprising a unit data group VTSTT_VOBS formed by the unit data group formation means and unit data link information generated by the link information generation means; and
   closed session processing means for performing a closed session process so that other reproducing apparatuses can read an optical disc recording at least one data group,
   wherein the closed session processing means generates a menu image including the CHP thumbnail image in the cell of VMGM_VOBS, which corresponds to a direct menu screen page capable of directly selecting CHP, generates menu image link information for linking with the menu image, and records the menu image and the menu image link information on the optical disc.

2. The optical disc recording apparatus according to claim 1,
   wherein the closed session processing means generates a menu image including at least one thumbnail image.

3. The optical disc recording apparatus according to claim 1 comprising storage means for storing a thumbnail image generated by the thumbnail image generation means,
   wherein the closed session processing means, when generating a menu image, uses a thumbnail image stored in the storage means.

4. The optical disc recording apparatus according to claim 3, wherein the storage means is flash memory.

5. The optical disc recording apparatus according to claim 1, the closed session processing means performs a closed session process so that other reproducing apparatuses can read an optical disc such as DVD-R or DVD-RW recording at least one data group.

6. An optical disc recording method to record unit data generated by division based on a specified reproduction unit according to a specified format on an optical disc, wherein the format is a DVD-video format, comprising the steps of:
   forming VTSTT_VOBS as a unit data group comprising at least one piece of the unit data,
   wherein the unit data is a chapter (CHP);
   generating a CHP thumbnail image for unit data each time the unit data is recorded on the optical disc;
   generating unit data link information included in VTSM_PGCI to link with each unit data forming the unit data group VTSTT_VOBS;

generating VTS as a data group comprising the unit data group VTSTT_VOBS and the unit data link information;

performing a closed session process so that other reproducing apparatuses can read an optical disc recording at least one data group, wherein the closed session processing step generates a menu image including the CHP thumbnail image in the cell of VMGM_VOBS, which corresponds to a direct menu screen page capable of directly selecting CHP, generates menu image link information for linking with the menu image, and records the menu image and the menu image link information on the optical disc.

* * * * *